(12) United States Patent
Wu

(10) Patent No.: US 7,753,658 B2
(45) Date of Patent: Jul. 13, 2010

(54) SELF-ATTACHING PUMP

(76) Inventor: Scott Wu, No. 6, Lane 176, Wu Fu Road, Wu Feng Hsiang, Taichung Hsien (TW)

( * ) Notice: Subject to any disclaimer, the term of this patent is extended or adjusted under 35 U.S.C. 154(b) by 484 days.

(21) Appl. No.: 11/469,283

(22) Filed: Aug. 31, 2006

(65) Prior Publication Data
US 2008/0054587 A1 Mar. 6, 2008

(51) Int. Cl.
F04B 53/00 (2006.01)
(52) U.S. Cl. .................. 417/234; 417/313; 417/236
(58) Field of Classification Search .......... 417/231, 417/234; 280/202, 201; 92/58.1; 137/565.25
See application file for complete search history.

(56) References Cited

U.S. PATENT DOCUMENTS

| 4,120,614 A | * | 10/1978 | Bouder | 417/63 |
| 4,569,275 A | * | 2/1986 | Brunet | 92/58.1 |
| 4,803,857 A | * | 2/1989 | Hall et al. | 70/58 |
| 5,236,169 A | * | 8/1993 | Johnsen | 248/561 |
| 5,324,174 A | * | 6/1994 | Diotte | 417/234 |
| 5,347,913 A | * | 9/1994 | Stepner | 92/58.1 |
| 5,494,411 A | * | 2/1996 | Chuang | 417/234 |
| 5,538,398 A | * | 7/1996 | Elson | 417/53 |
| 5,890,725 A | * | 4/1999 | Wood | 280/201 |
| 6,017,196 A | * | 1/2000 | Wu | 417/234 |
| 6,164,938 A | * | 12/2000 | Chuang | 417/569 |
| 6,506,026 B2 | * | 1/2003 | Wu | 417/234 |
| 6,615,704 B2 | * | 9/2003 | Chuang | 92/58.1 |
| 6,736,618 B2 | * | 5/2004 | Wu | 417/554 |
| 6,817,060 B2 | * | 11/2004 | Huang et al. | 16/111.1 |

OTHER PUBLICATIONS

Taiwanese Patent M283784, Dec. 21, 2005, 6 pages.

* cited by examiner

Primary Examiner—Devon Kramer
Assistant Examiner—Amene S Bayou
(74) Attorney, Agent, or Firm—Alan Kamrath; Kamrath & Associates PA

(57) ABSTRACT

A self-attaching pump includes a cylinder, a nozzle attached to the cylinder, a piston installed in the cylinder, a rod connected to the piston, a handle with a first end and an opposite second end, a fastener for pivotally connecting the second end of the handle to the rod and a stressing device arranged on the cylinder for stressing the self-attaching pump. There are defined a first value for the distance between the fastener and the first end of the handle, a second value for the length of the elastic element when the stressing does not stress the self-attaching pump and a third value for the distance between the piston and the nozzle when the first end of the handle reaches the stressing device while the stressing device does not stress the self-attaching pump. The first value is larger than the second value that is larger than the third value.

17 Claims, 7 Drawing Sheets

SELF-ATTACHING PUMP

BACKGROUND OF INVENTION

1. Field of Invention

The present invention relates to a bicycle and, more particularly, to a self-positioning pump that can be attached to a bicycle without the use of an additional device.

2. Related Prior Art

Disclosed in Taiwanese Patent M283784 is a device for attaching a pump 4 to a bicycle. The device includes a curved rod 32, an upper hook 33 securely attached to the curved rod 32 and a lower hook 34 movably attached to the curved rod 32. The upper hook 33 is engaged with an upper end of the pump 4 while the lower hook 34 is engaged with a lower end of the pump 4. Thus, the pump 4 is attached to the bicycle. However, the device is part of a carriage. That is, a rider has to buy and install the carriage. Without the carriage, the rider cannot attach the pump 4 to the bicycle, and this is inconvenient.

The present invention is therefore intended to obviate or at least alleviate the problems encountered in the prior art.

SUMMARY OF INVENTION

According to the present invention, a self-attaching pump includes a cylinder, a nozzle attached to the cylinder, a piston movably installed in the cylinder, a rod connected to the piston, a handle with a first end and a second end opposite to the first end, a fastener for pivotally connecting the second end of the handle to the rod and a stressing device arranged on the cylinder for stressing the self-attaching pump. There are defined a first value for the distance between the fastener and the first end of the handle, a second value for the length of an elastic element when the stressing does not stress the self-attaching pump and a third value for the distance between the piston and the nozzle when the first end of the handle reaches the stressing device while the stressing device does not stress the self-attaching pump. The first value is larger than the second value that is larger than the third value.

An advantage of the self-attaching pump according to the present invention is convenient attachment to a bicycle without the use of any additional device.

Another advantage of the self-attaching pump according to the present invention is the protection of the handle since the handle is kept from the tube when the piston is pushed to the nozzle.

Other advantages and features of the present invention will become apparent from the following description referring to the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
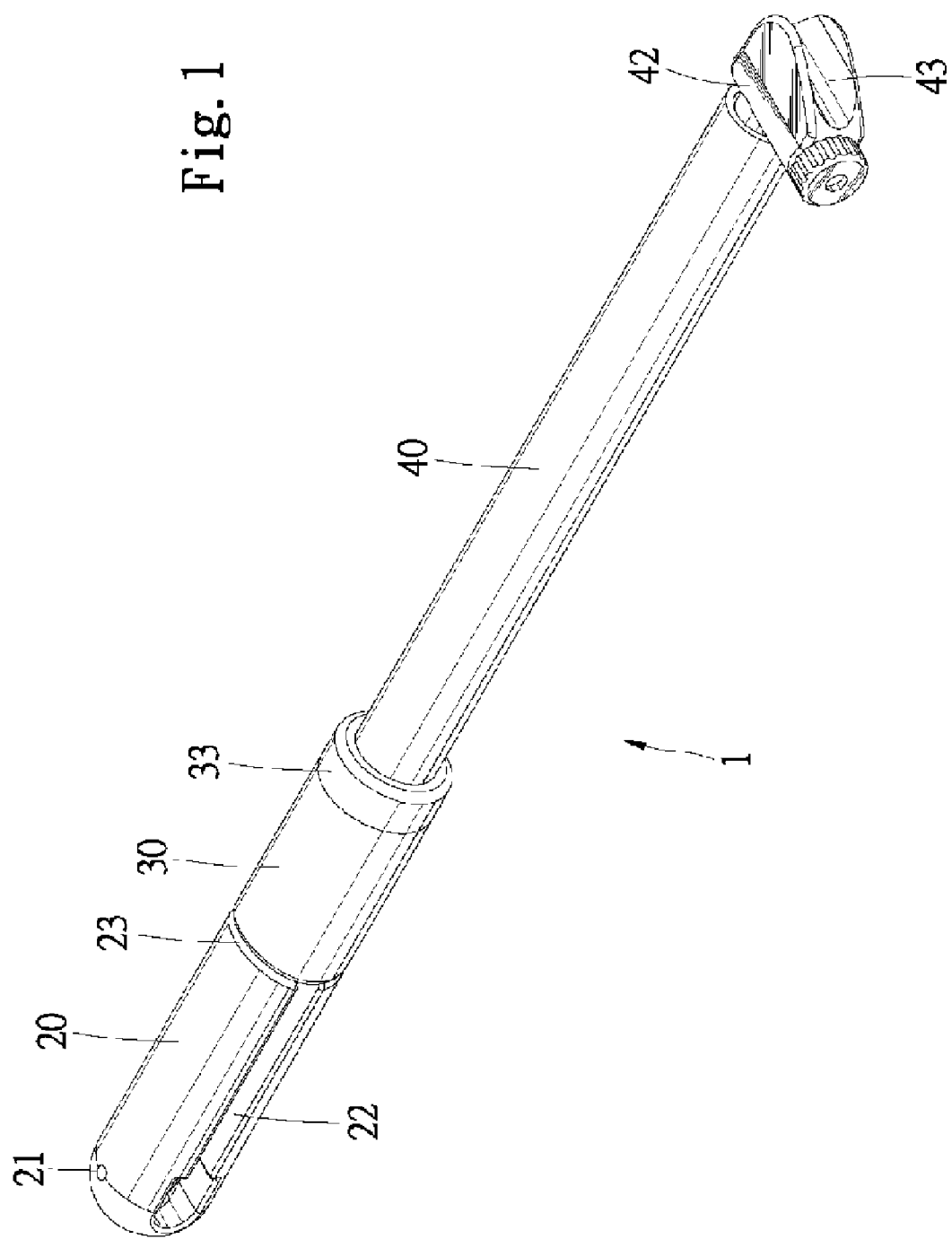
FIG. 1 is a perspective view of a self-attaching pump according to the preferred embodiment of the present invention.

Referring to FIG. 1, there is shown a self-attaching pump 1 according to the preferred embodiment of the present invention.

Figure 2:
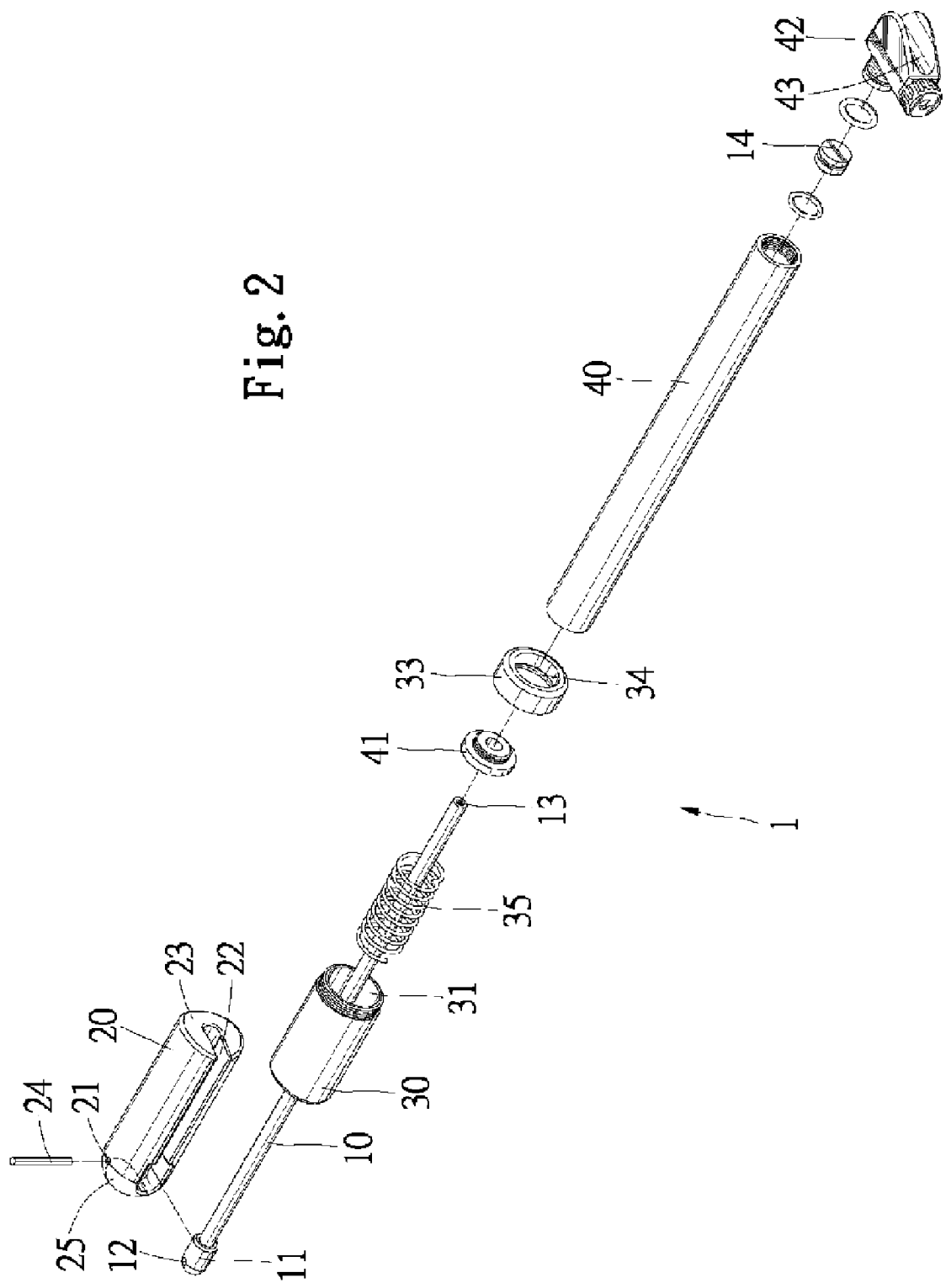
FIG. 2 is an exploded view of the self-attaching pump of FIG. 1.

Referring to FIG. 2, the self-attaching pump 1 includes a cylinder 40, a piston 14 movably installed in the cylinder 40, a rod 10 connected to the piston 14, a handle 20 attached to the rod 10, a stressing device arranged between the handle 20 and the cylinder 40 and a nozzle 42 attached to the cylinder 40.

The rod 10 includes a screw hole 13 axially defined in an end and an aperture 12 transversely defined in a head 11 formed at an opposite end. The screw hole 13 receives a threaded bolt extended from the piston 14 so that the rod 10 is connected to the piston 14.

The stressing device includes an elastic element 35 arranged around the rod 10 and a casing for concealing the elastic element 35. The casing may have to restrain the length of the elastic element 35 if the original length of the elastic element 35 is larger than the internal length of the casing. The elastic element 35 is preferably a helical spring. The casing includes a tube 30 and a collar 33 engaged with the tube 30. The collar 33 includes an annular shoulder 34 on an internal face thereof and a thread formed on the internal face thereof. The tube 30 includes a thread formed on an external side at an end thereof, an opening 31 axially defined in the end thereof and an annular flange 32 formed on an internal face at an opposite end thereof.

There is a ring 41 formed with a thread on an external face thereof and an annular flange on the external face thereof.

Figure 5:
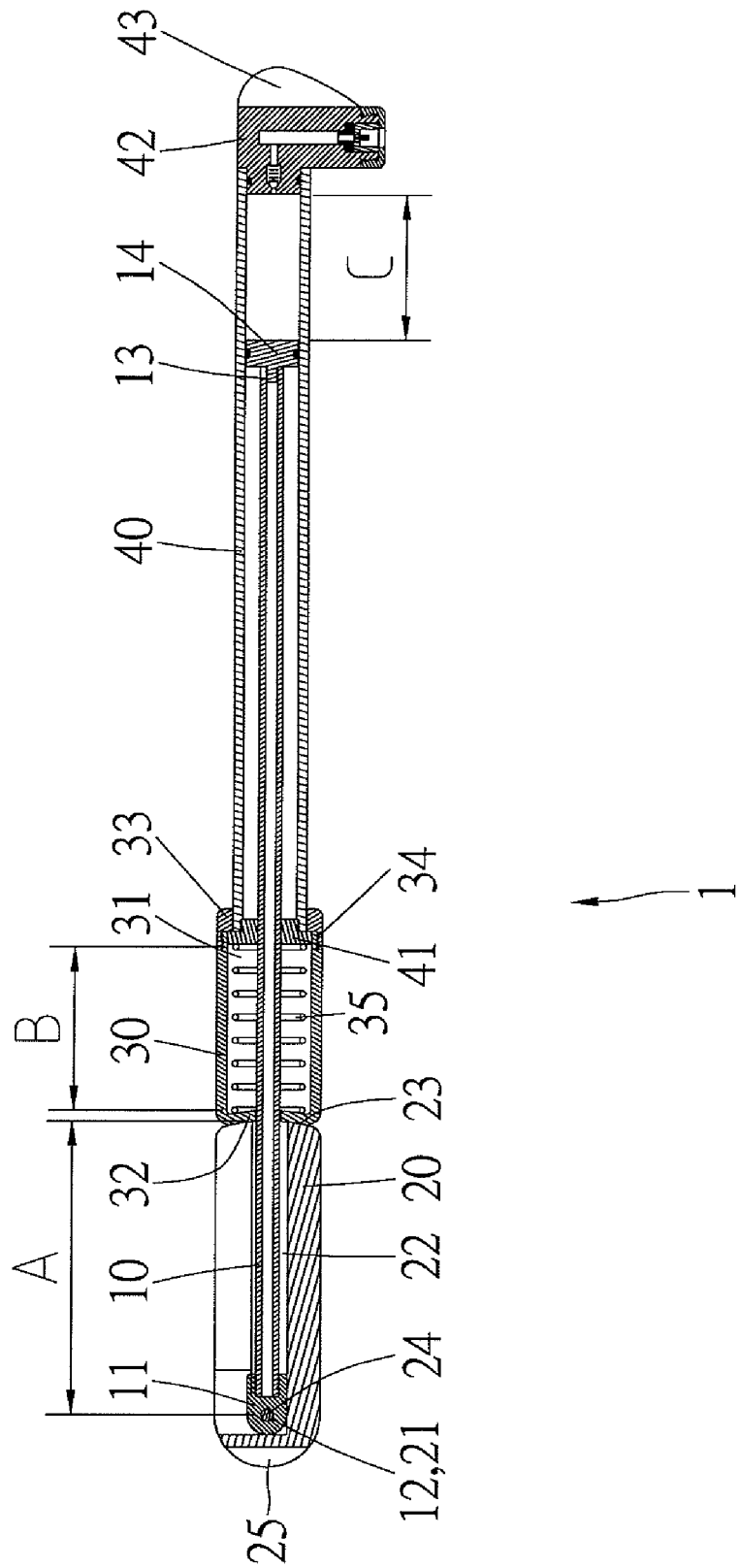
FIG. 5 is a cross-sectional view of the self-attaching pump shown in FIG. 1.

Referring to FIG. 5, the collar 33 is arranged around the cylinder 40 before the thread of the ring 41 is engaged with a thread formed on an internal face at an end of the cylinder 40. The thread of the tube 30 is engaged with the thread of the collar 33 so that the tube 30 is connected to the collar 33. The tube 30 and the collar 33 together form a casing for concealing the elastic element 35. The annular shoulder 34 of the collar 33 is located against the annular flange of the ring 41. The elastic element 35 is arranged between the annular flange of the ring 41 and the annular flange 32 of the tube 30.

The handle 20 includes a groove 22 longitudinally defined therein from a first end 23 to a second end 25, a recess defined in the second end 25 and an aperture 21 transversely defined in the second end 25 so that the aperture 21 is in communication with the groove 22.

The groove 22 receives the rod 10. A fastener 24 is fit in the aperture 12 of the rod 10 through the aperture 21 of the handle 20 so that the rod 10 is pivotally connected to the handle 20. The fastener 24 is preferably a pin.

The nozzle 42 defines a groove 43.

Figure 3:
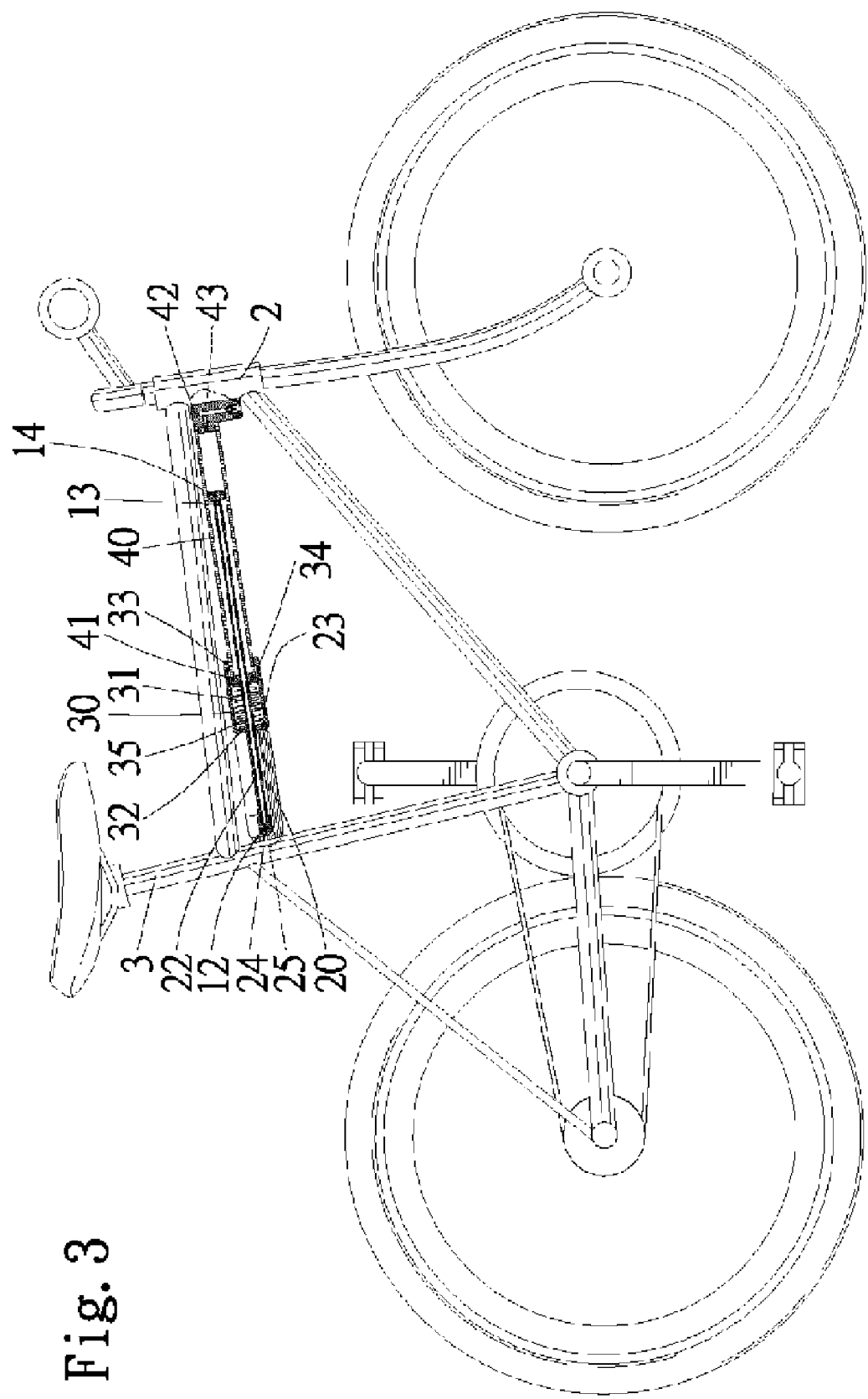
FIG. 3 is a cross-sectional view of the self-attaching pump shown in FIG. 1 attached to a bicycle.

Referring to FIG. 3, the self-attaching pump 1 is attached to the bicycle. The groove 43 of the nozzle 42 receives a head tube 2 of the bicycle. The recess of the handle 20 receives a saddle tube 3 of the bicycle. Because of the stressing device, the self-attaching pump 1 stressed between the head tube 2 and the saddle tube 3 of the bicycle.

Figure 4:
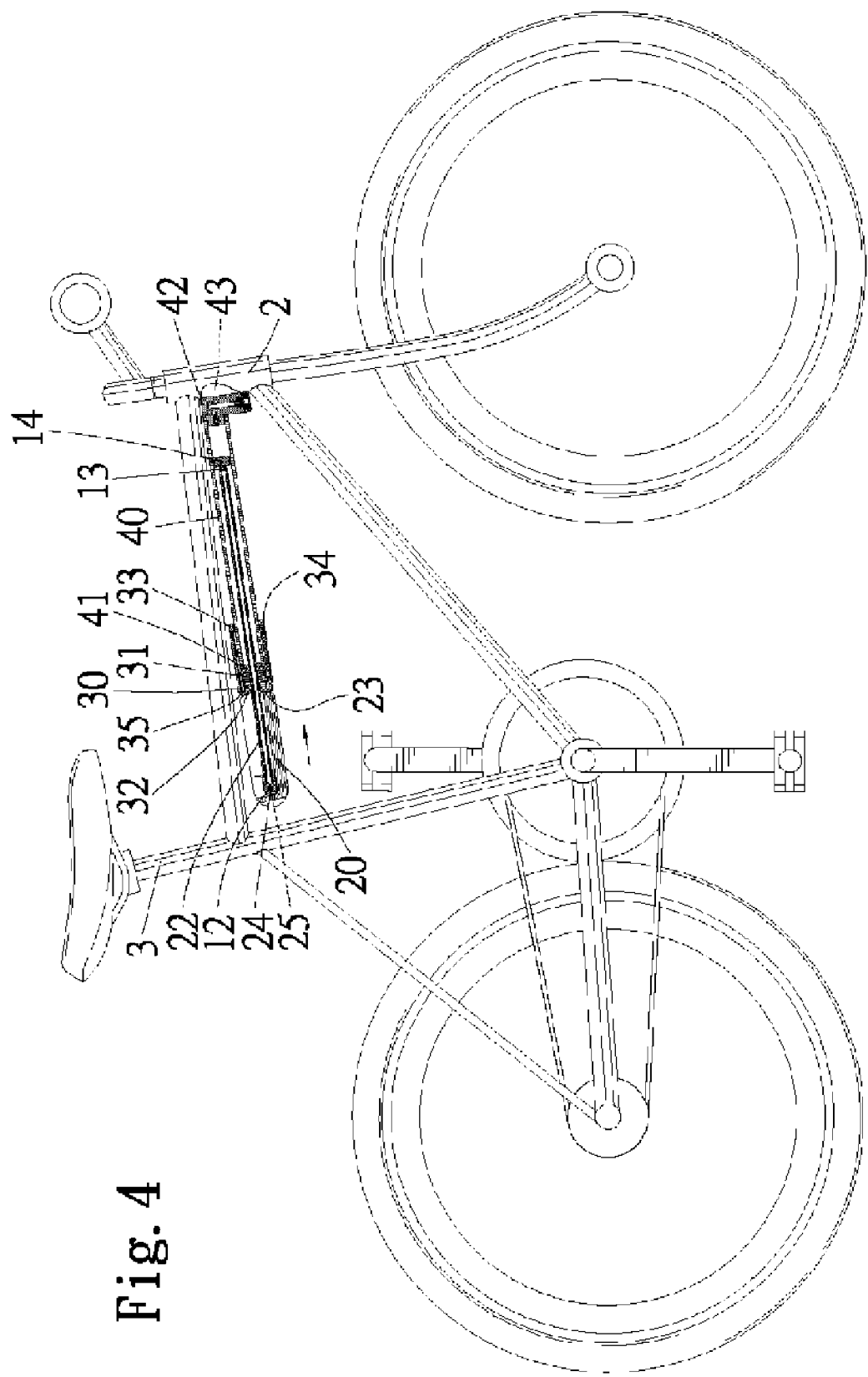
FIG. 4 is a cross-sectional view of the self-attaching pump in another position than shown in FIG. 3.

Referring to FIG. 4, the self-attaching pump 1 is compressed so that self-attaching pump 1 can be removed from the bicycle.

Referring to FIG. 5, "A" is assigned to the distance between the first end 23 of the handle 20 and the center of the aperture 21 of the handle 20. "B" is assigned to the length of the elastic element 35 when the tube 30 is not pushed towards the nozzle 42, i.e., when the stressing device does not stress the self-attaching pump 1. "C" is assigned to the distance between the piston 14 and the nozzle 42 when the first end 23 of the handle 20 reaches the annular flange 32 of the tube 30 while the tube 30 is not pushed towards the nozzle 42, i.e., while the stressing device does not stress the self-attaching pump 1. The value A is larger than the value B by a distance at least equal to one half of the width of the handle 20. Preferably, the value A is larger than the sum of one half of the width of the handle 20 and the thickness of an ordinary rider's fingers. The value B is larger than the value C. The values A, B and C are defined for the following reason.

Figure 6:
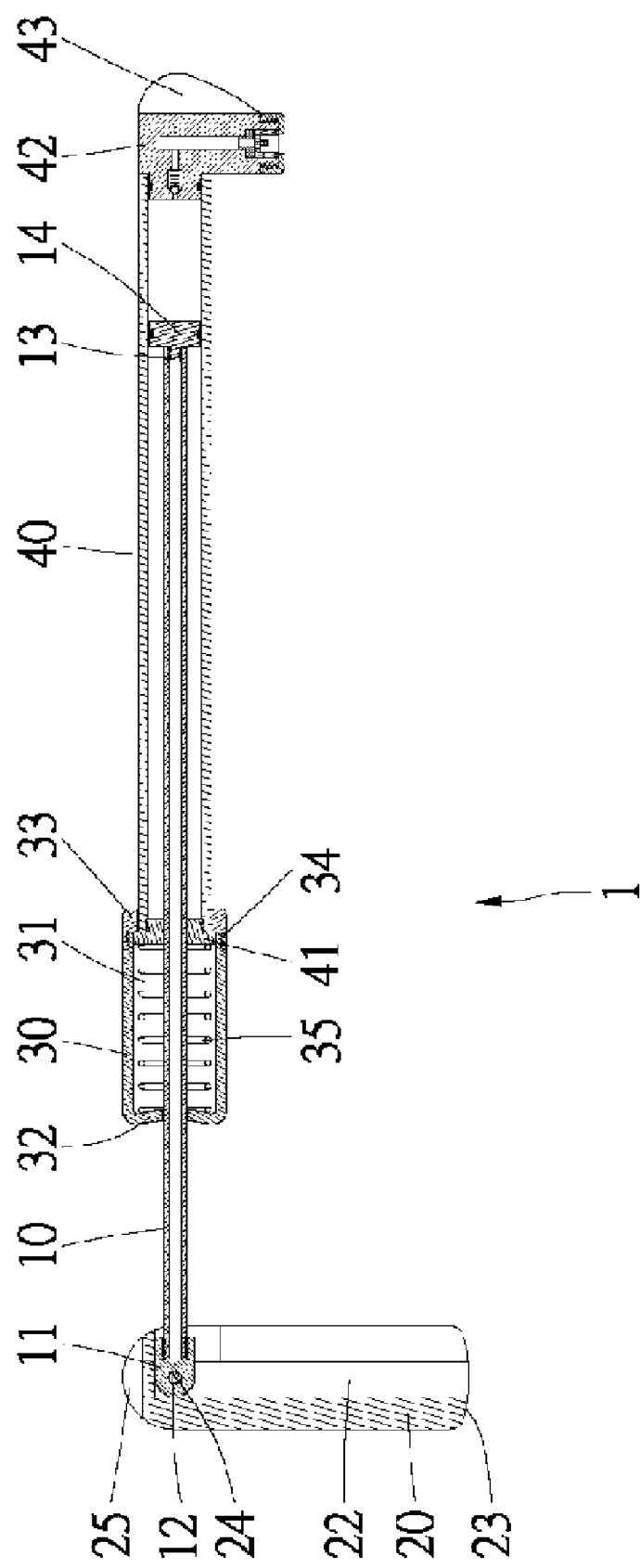
FIG. 6 is a cross-sectional view of the self-attaching pump in another position than shown in FIG. 5.

Referring to FIG. 6, the handle 20 extends perpendicular to the rod 10 when the self-attaching pump 1 is operated.

Figure 7:
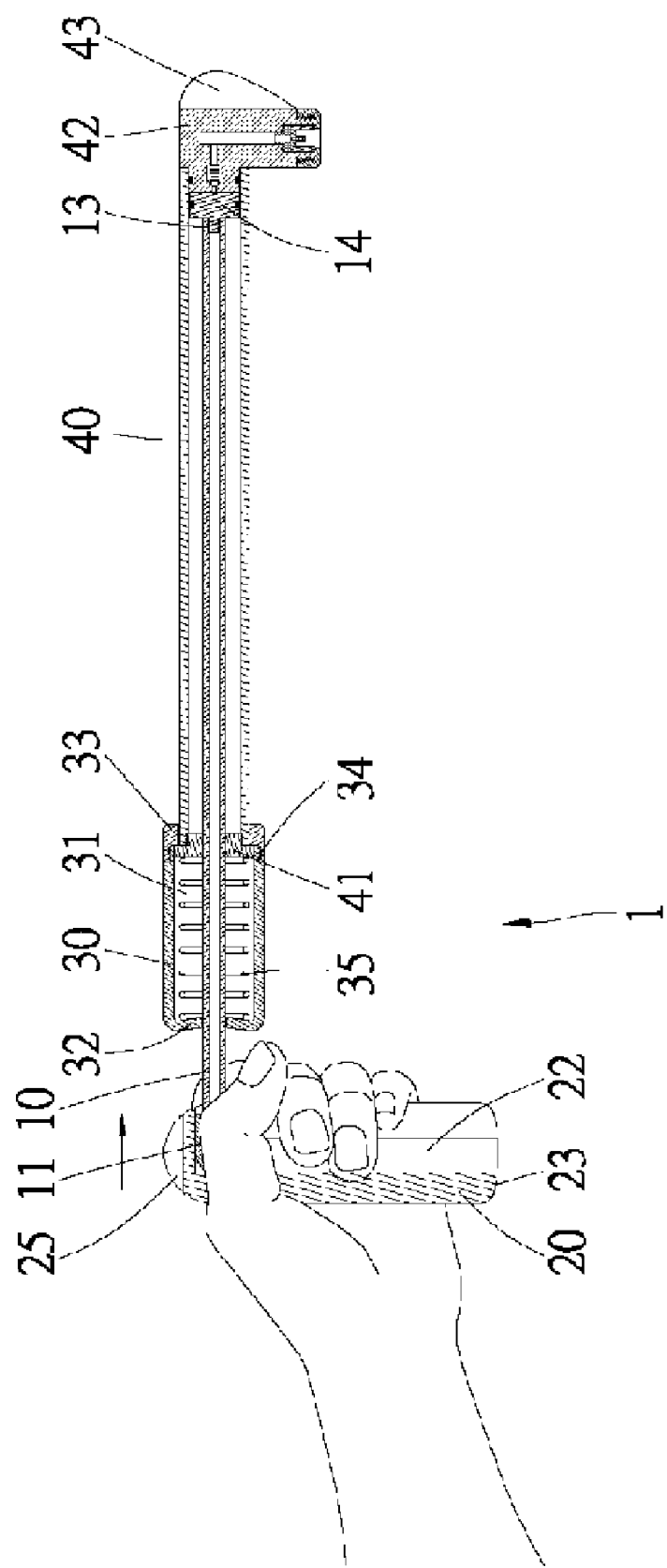
FIG. 7 is a cross-sectional view of the self-attaching pump in another position than shown in FIG. 6.

Referring to FIG. 7, the self-attaching pump 1 is operated by a rider's hand. The piston 14 is pushed to the nozzle 42 while the handle 20 is kept from the annular flange 32 of the tube 30. Hence, the handle 20 is not impinged onto the annular flange 32 of the tube 30, i.e., it is protected. Preferably, the rider's fingers are not clamped between the handle 20 and the annular flange 32 of the tube 30 in operation, i.e., they are protected.

The self-attaching pump according to the present invention exhibits several advantages. Firstly, it can be attached to a bicycle without the use of any additional device. Secondly, the handle 20 is protected. Thirdly, the rider's fingers are protected so that the user can push the handle 20 towards the nozzle 42 as hard as possible without having to worry about hurting the fingers.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A self-attaching pump attachable to a bicycle without the use of any additional device, the self-attaching pump comprising: a cylinder; a nozzle attached to the cylinder; a piston movably installed in the cylinder; a rod connected to the piston; a handle comprising a first end and a second end opposite to the first end; a fastener pivotally connecting the second end of the handle to the rod, with the handle pivotal about the fastener between an operating position and an attaching position, with the handle being parallel to the rod in the attaching position, with the handle being at a non-parallel angle to the rod in the operating position, and a stressing device arranged on the cylinder abutting with the first end of the handle in the attaching position, with the stressing device stressing the self-attaching pump when the handle is in the attaching position;

wherein there are defined a first value for the distance between the fastener and the first end of the handle, a second value for the length of the stressing device when the stressing device does not stress the self-attaching pump and a third value for the distance between the piston and the nozzle when the first end of the handle in the attaching position reaches the stressing device while the stressing device does not stress the self-attaching pump, wherein the first value is larger than the second value that is larger than the third value, with the first value being parallel to the rod in the attaching position and being at a non parallel angle to the rod in the operating position, with the first end of the handle not reaching the stressing device in the operating position; and wherein the first value is larger than the second value by a difference at least equal to one half of the width of the handle.

2. The self-attaching pump according to claim 1 wherein the difference is at least equal to the sum of one half of the width of the handle and the thickness of an ordinary rider's fingers.

3. The self-attaching pump according to claim 1 wherein the nozzle defines a groove for receiving a head tube of the bicycle.

4. The self-attaching pump according to claim 1 wherein the second end of the handle is recessed for receiving a saddle tube of the bicycle.

5. The self-attaching pump according to claim 1 wherein the handle defines a longitudinal groove receiving the rod in the attaching position.

6. The self-attaching pump according to claim 1 wherein the stressing device comprises an elastic element compressed between the cylinder and the first end of the handle in the attaching position.

7. The self-attaching pump according to claim 6 wherein the stressing device comprises a casing concealing the elastic element.

8. The self-attaching pump according to claim 7 wherein the casing comprises a tube and a collar engaged with the tube.

9. The self-attaching pump according to claim 8 wherein the collar is arranged around the cylinder.

10. The self-attaching pump according to claim 9 further comprising a ring attached to the cylinder before the collar is arranged around the cylinder so that the ring can be abutted against the collar.

11. A pump comprising, in combination: a cylinder portion having a nozzle end and an opposite end, wherein the cylinder portion comprises a cylinder including the nozzle end and a stressing device arranged on the cylinder and including the opposite end; a nozzle attached to the nozzle end of the cylinder portion; a piston slideably installed in the cylinder portion; a rod connected to the piston; a handle comprising a first end and a second end opposite to the first end; a fastener pivotally connecting the second end of the handle to the rod, with the handle pivotal about the fastener between an operating position and an attaching position, with the handle being parallel to the rod in the attaching position, with the handle being at a non-parallel angle to the rod in the operating position, wherein there are defined a handle value for the distance between the fastener and the first end of the handle and a piston value for the distance of the piston from the nozzle end of the cylinder portion when the first end of the handle in the attaching position abuts with the opposite end of the cylinder portion while the stressing device does not stress the self-attaching pump, with the piston value being less than the handle value.

12. The self-attaching pump according to claim 11 wherein the handle defines a longitudinal groove receiving the rod in the attaching position.

13. The self-attaching pump according to claim 11 wherein the stressing device comprises an elastic element compressed between the cylinder and the first end of the handle in the attaching position.

14. The self-attaching pump according to claim 13 wherein the stressing device comprises a casing concealing the elastic element.

15. The self-attaching pump according to claim 14 wherein the casing comprises a tube and a collar engaged with the tube.

16. The self-attaching pump according to claim 15 wherein the collar is arranged around the cylinder.

17. The self-attaching pump according to claim 1 wherein the handle terminates in the second end, with the handle and the rod defining an L-shape when the handle is in an operating position.

* * * * *